United States Patent [19]

Blaker et al.

[11] Patent Number: 5,790,973
[45] Date of Patent: Aug. 4, 1998

[54] LAST EXIT WARNING SYSTEM

[75] Inventors: David A. Blaker, Fennville; James R. Geschke; Michael J. Suman, both of Holland, all of Mich.

[73] Assignee: Prince Corporation, Holland, Mich.

[21] Appl. No.: 575,040

[22] Filed: Dec. 19, 1995

[51] Int. Cl.⁶ .......................... B06F 165/00; H04Q 7/32
[52] U.S. Cl. .................. 701/123; 701/201; 701/204; 701/211; 701/213; 340/991; 340/994; 340/995
[58] Field of Search .................. 364/442, 444.1, 364/448, 449.1, 449.2, 449.3, 449.5, 449.7, 446; 340/438, 425.5, 990, 995, 992, 991, 994; 701/123, 201, 206, 207, 208, 209, 211, 216, 204

[56] References Cited

U.S. PATENT DOCUMENTS

| | | | |
|---|---|---|---|
| 3,836,690 | 9/1974 | Purtle, Jr. | 364/442 |
| 4,046,998 | 9/1977 | Kuno et al. | 364/442 |
| 4,179,740 | 12/1979 | Malin | 73/1.88 |
| 4,312,041 | 1/1982 | DeJonge | 340/963 |
| 4,400,779 | 8/1983 | Kosuge et al. | 364/442 |
| 4,564,905 | 1/1986 | Masuda et al. | 364/423.098 |
| 4,590,568 | 5/1986 | Barske et al. | 364/426.041 |
| 4,663,718 | 5/1987 | Augello et al. | 340/462 |
| 4,953,305 | 9/1990 | Van Lente et al. | 364/184 |
| 5,021,961 | 6/1991 | Ross et al. | 364/443 |
| 5,153,582 | 10/1992 | Davis | 340/825.44 |
| 5,172,321 | 12/1992 | Ghaem et al. | 364/444.2 |
| 5,229,947 | 7/1993 | Ross et al. | 364/443 |
| 5,301,113 | 4/1994 | To et al. | 364/442 |
| 5,335,246 | 8/1994 | Yokev et al. | 340/825.47 |
| 5,455,716 | 10/1995 | Suman et al. | 359/838 |
| 5,459,666 | 10/1995 | Casper et al. | 364/442 |
| 5,508,917 | 4/1996 | Siegle et al. | 364/449.1 |
| 5,526,265 | 6/1996 | Nakhla | 364/428 |
| 5,543,789 | 8/1996 | Behr et al. | 340/995 |
| 5,568,390 | 10/1996 | Hirota et al. | 364/444.1 |

*Primary Examiner*—Tan Q. Nguyen
*Attorney, Agent, or Firm*—Price, Heneveld, Cooper, DeWitt & Litton

[57] ABSTRACT

A warning system automatically alerts a vehicle operator to the fact that the next available exit should be taken for a desired or necessary service such as refueling. The system includes a source of information providing the current vehicle location as well as a source of information identifying the location of available selected service locations closest to each of the next two exits of a limited access highway. The system in a preferred embodiment includes a source of information indicating the available range of the vehicle (distance to empty or D.T.E.) and a microprocessor for calculating when the driver should take the next available exit to reach the desired service. The system further includes a suitable alarm which may be an audible alarm, a visual alarm or both to alert the vehicle operator that the next available exit should be taken.

21 Claims, 4 Drawing Sheets

LAST EXIT WARNING SYSTEM

BACKGROUND OF THE INVENTION

The present invention relates to a warning system for a vehicle operator and, particularly, one which provides notification to exit a limited access highway for fuel.

Many vehicles currently include computers which calculate not only fuel economy but also, based upon the remaining fuel, a distance-to-empty estimation for preventing running out of fuel. Although the vehicle operator can readily select the distance-to-empty information for display the operator may not be aware of the nearest service station at which fuel can be purchased nor the distance to such a service station. Therefore, and particularly when driving on limited access highways, the vehicle operator can still encounter an out-of-fuel crisis. This can be particularly troublesome in isolated areas where help is not readily available or in some urban areas where having a disabled vehicle is undesirable. Although motorist aids including frequent roadway signs and on-board navigational systems are available, there remains a need for a warning system which will notify the vehicle operator to exit, for example, a limited access highway to obtain fuel or other desired services prior to the time the vehicle is caught between two exits beyond the point of no return where insufficient fuel remains to reach the nearest service station.

SUMMARY OF THE PRESENT INVENTION

The system of the present invention accommodates this need by providing a warning system which will automatically alert the vehicle operator to the fact that the next available exit should be taken for a desired or necessary service such as refueling.

In a preferred embodiment of the invention, the system includes a source of information providing the current vehicle location as well as a source of information identifying the location of available selected service locations closest to each of the next two exits of, for example, a limited access highway. The system in a preferred embodiment includes a source of information indicating the available range of the vehicle (distance to empty or D.T.E.) and a microprocessor for calculating when the driver should take the next available exit to reach the desired service.

In most instances the service would be a service station for providing fuel, although the desired service may involve other parameters such as the time for stopping for lunch, dinner or checking into an available hotel. The system includes a suitable alarm which may be an audible alarm, a visual alarm or both to alert the vehicle operator that the next available exit should be taken. Such a system, therefore, provides the vehicle operator with the assurance that the vehicle will not run out of fuel prior to the availability of a service station at a forthcoming exit. Likewise, the vehicle parameter can alert the vehicle operator to exit to achieve a desired arrival time for certain other services, such as dining or checking into hotels, and forewarn the vehicle operator to exit for such facilities. In one embodiment, a vehicle mounted housing includes the electrical circuits of the invention which receive operating power from the vehicle's battery. Such circuits preferably include a two-way pager permitting the vehicle operator to receive and transmit paging messages. These and other features, objects and advantages of the present invention will become apparent upon reading the following description thereof, together with reference to the accompanying drawings.

DETAILED DESCRIPTION OF THE PREFERRED EMBODIMENT

Figures 1A, 1B:
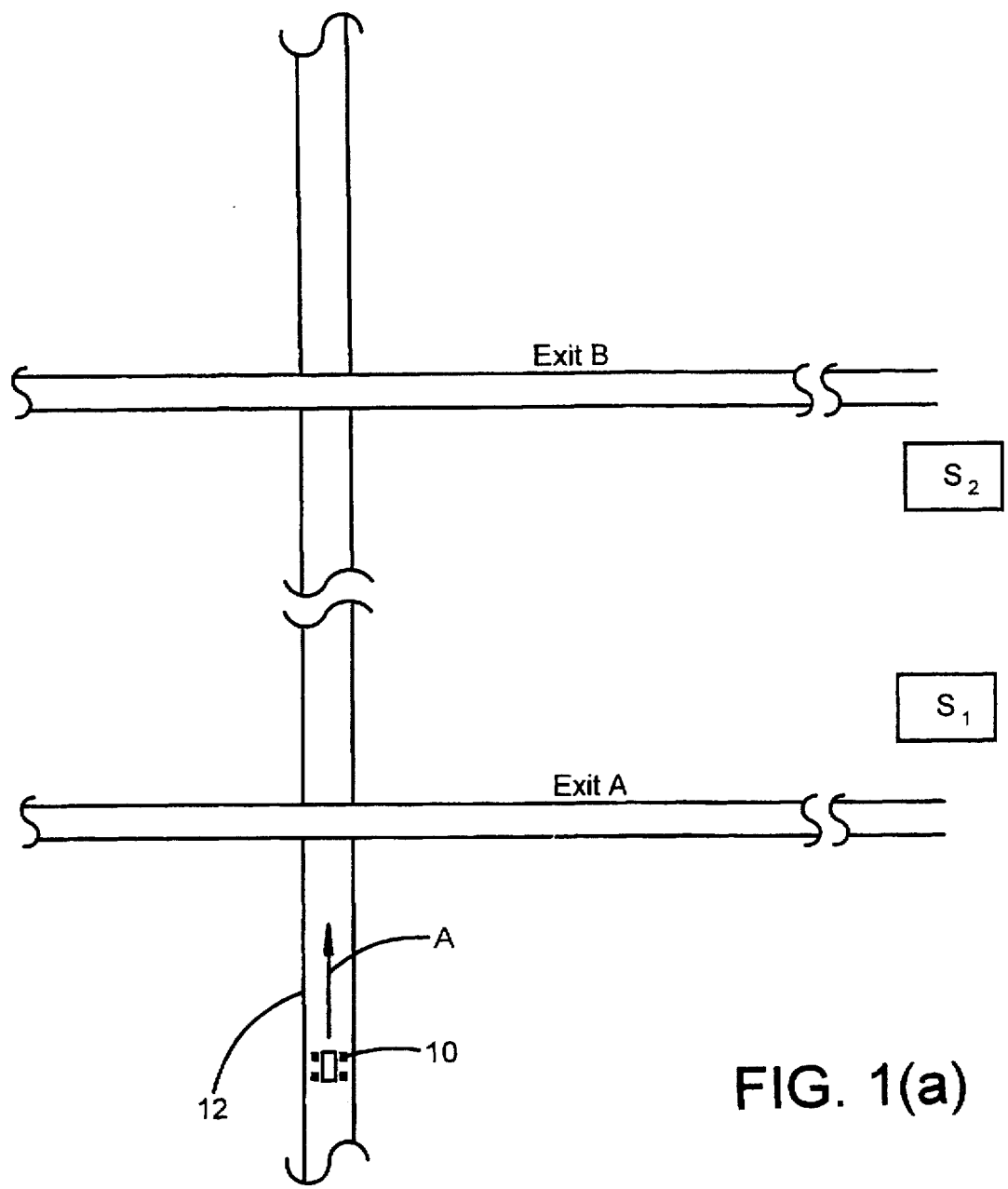
FIG. 1(a) is a diagrammatic view of a vehicle and a highway map showing exits and service locations to be employed.
FIG. 1(b) is a block illustrating distance to empty and distance to selected service locations.

Referring initially to FIG. 1(a), there is shown a map which pictorially illustrates a vehicle 10 traveling in the direction of arrow A along a limited access highway 12 having an exit A and an exit B spaced farther along highway 12. Along exit A is a service facility $S_1$ which is located a distance from the current position of vehicle 10 of, for example, 7 miles. Exit B includes a service facility $S_2$ which is 32 miles from the vehicle's present location. Vehicle 10, such as an automobile, conventionally includes a fuel computer which provides, on a vehicle data bus, distance-to-empty data which, in the example shown in FIG. 1(b), indicates tile distance to empty (D.T.E.) is 28 miles. Although the vehicle operator may be aware of the fact that exit A is, for example, 3 miles ahead and exit B is 20 miles ahead, the vehicle operator may not be aware of the fact that the only open service location $S_2$ is beyond the range of the vehicle and, therefore, the vehicle will run out of fuel prior to reaching service station $S_2$, which is the closest service facility from the otherwise reachable exit B. Thus, it is desired, in order to forewarn the vehicle operator of an impending out-of-fuel situation, to provide information to the vehicle operator as to the vehicle's present location and the locations of facilities $S_1$ and $S_2$ and their distance such that, prior to going beyond exit A, the vehicle operator receives a warning signal allowing the operator to exit at exit A and utilize the services of facility $S_1$.

Figure 2:
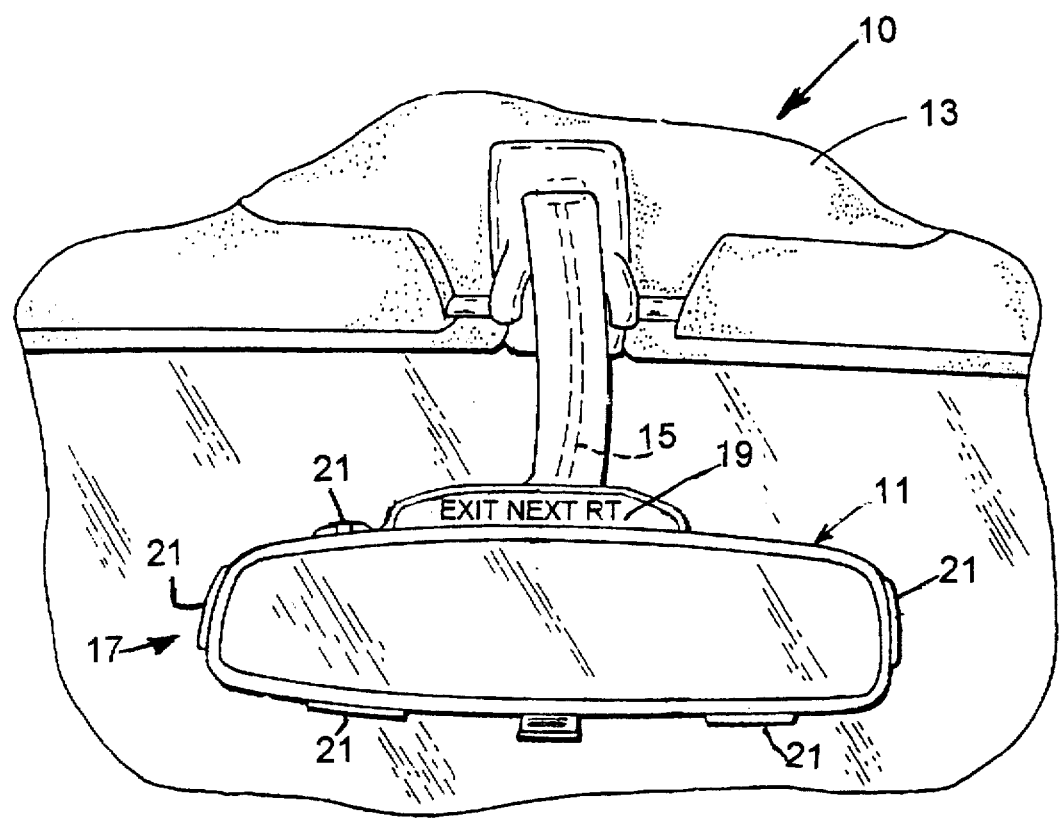
FIG. 2 is a fragmentary perspective view of the interior of the vehicle showing a rearview mirror including the system of the present invention.

Referring to FIG. 2, there is shown a housing 11, such as a rearview mirror housing, adapted to be attached to tile roof structure 13 of a vehicle 10. Mounted within the mirror housing are the electrical components of FIG. 3, which are electrically connected to the vehicle electrical system through suitable electrical conductors 15 for receiving operating power from the vehicle's battery. Housing 11 includes an alpha-numeric display 19 for selectively displaying paging messages from the two-way pager 34 (FIG. 3) and other information to the vehicle operator. Also, a plurality of control switches 21 are mounted to housing 11 at various locations for the operator to input control signals to the circuit shown in FIG. 3. The display and control switches are illustrated by block 28 in FIG. 3. The details of construction of the rearview mirror assembly 17, including the housing 11 and its mounting to the vehicle, are disclosed in detail in U.S. Pat. No. 5,455,716, the disclosure of which is incorporated herein by reference.

Figure 3:
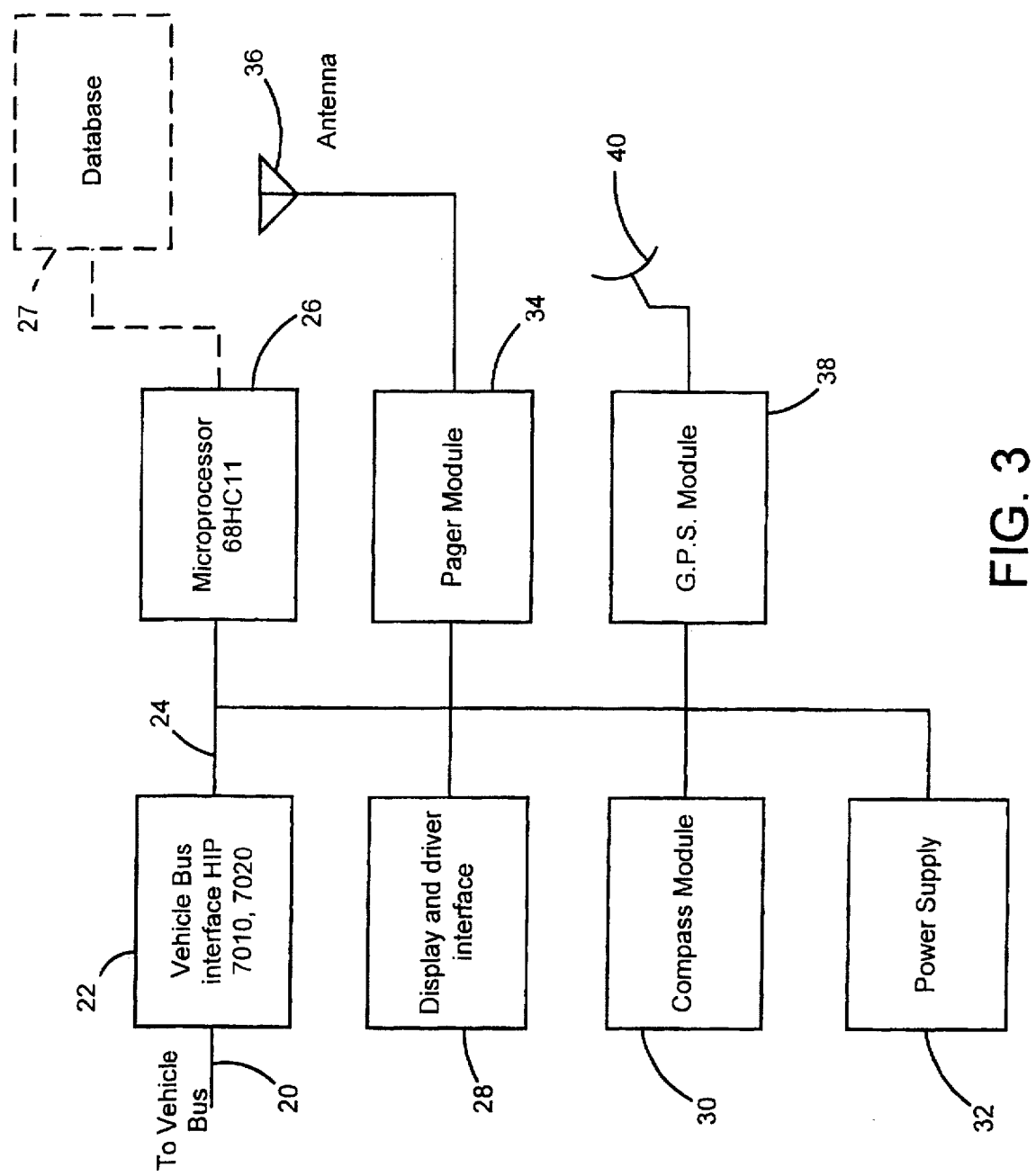
FIG. 3 is an electrical circuit diagram in block form of a vehicle mounted electrical system including the features of the present invention.

Turning now to FIG. 3, there is shown the electrical circuit of the present invention which is mounted in mirror housing 11. The vehicle 10 includes a data bus line 20 which is coupled to the vehicle bus interface circuit 22, which is a multiplex circuit coupled to a variety of system sensors and provides signals to bus 24 coupling the circuits of the present invention. The interface bus 22, therefore, receives signals from, for example, the vehicle's fuel gauge, the speedometer input and other vehicle operating parameters. The vehicle itself may conventionally include a computer for providing D.T.E. signals on bus 20, or such information can be easily calculated based upon the sensor inputs. The interface circuit 22 provides information in the form of serial data to a microprocessor 26 through a serial data line included on bus 24. Bus 24 also includes a clock line, an enable signal line and power supply conductors for coupling power from supply 32 coupled to the vehicle's battery via conductors 15 (FIG. 2) to the remaining circuit elements. The information on vehicle bus 20 may also be selectively displayed to the vehicle operator by a display 19 contained in circuit 28. Circuit 28 thus may include a conventional alpha-numeric digital display mounted to a vehicle overhead console, in a rearview mirror as shown in FIG. 2, or on the instrument panel. Circuit 28 also includes a suitable audible alarm for alerting the driver. The circuit also includes driver command control switches, such as a keyboard or push-button switches 21 on mirror housing 11. Such switches are commonly employed in vehicles for selecting and controlling the display and entry of data in a vehicle. The driver may thus select information to be displayed directly or enter a command to microprocessor 26 which responds to calculate and subsequently display the desired information.

In addition, the vehicle includes a compass module 30 such as the type disclosed in U.S. Pat. No. 4,953,305, which may include its own display or may be coupled by bus 24 as shown to provide a display through the vehicle display circuit 28. The power supply 32 provides suitable operating power for the components, which may include plus and minus Vcc supplies for the electronic circuits employed. The microprocessor 26 can be any number of commercially available microprocessors such as a Motorola 68HC11, which includes internal RAM and ROM memories for providing the program control functions including that of the present invention which is described below in connection with FIG. 4.

Vehicle 10 includes a pager module 34 which is coupled to a two-way antenna 36 for receiving and transmitting digital paging messages. Such a paging module can be of the type disclosed in U.S. Pat. No. 5,153,582, the disclosure of which is incorporated herein by reference. It is uniquely mounted in the vehicle rearview mirror housing and utilizes display 19 for displaying incoming paging messages. Transmitted responses to incoming information requests can be sent automatically under the control of microprocessor 26 or by the operator actuation of one or a predetermined sequence of switches 21. The vehicle installed pager 34 receives power from the vehicle's power source through supply 32. The pager module allows automatic or vehicle operator requested communication of the locations of available service areas from a database at a central station to which the vehicle operator subscribes and which makes such information available to the vehicle operator and vehicle electronic system through the pager module 34. In addition, vehicle 10 includes a navigation module 38 coupled to a suitable receiving antenna 40. In the preferred embodiment module 38 is a commercially available GPS module of the type manufactured by a number of suppliers including Motorola, Inc., Trimble Navigation, Ltd. or the like.

The serial data line of bus 24 is coupled to an SPI port for each of the circuit modules of FIG. 3. Also, the clock line is coupled to each of the circuits of FIG. 3 for receiving clock pulses from microprocessor 26 to synchronize the transfer of data between the modules. Finally, an enable line is coupled to each of the circuits for receiving enabling signals from the micmoprocessor to initiate the synchronized transfer of serial data between the microprocessor and each of the modules. The connection and data flow scheme for such interconnection is conventional, as is the coupling of the microprocessor to the vehicle bus line 20 through the interface 22.

Figure 4:
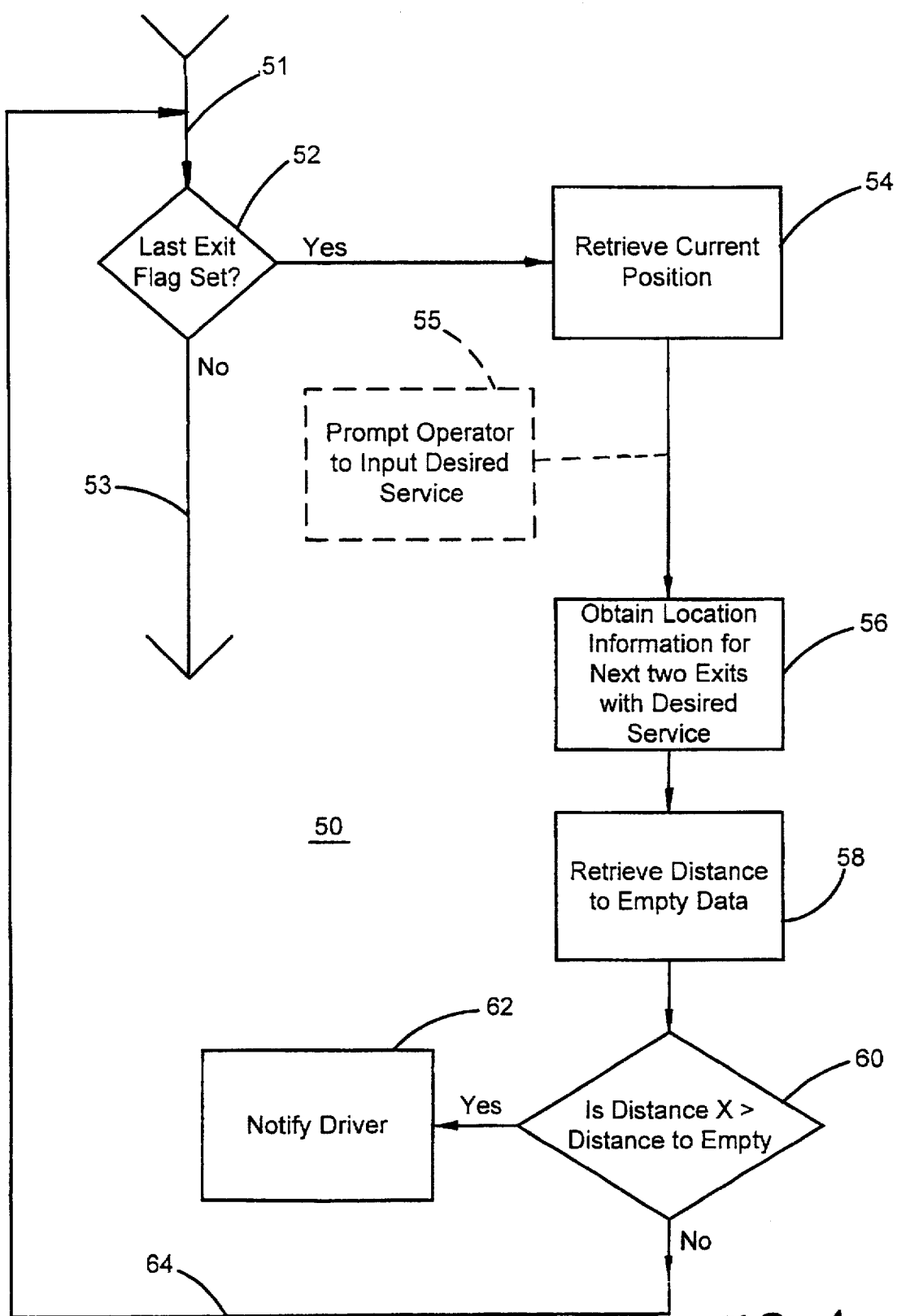
FIG. 4 is a flow diagram of the software programming for the microprocessor employed in tile system of the present invention.

The operation of the system is best understood by reference to FIG. 4 which shows the subroutine for the last exit warning, which subroutine 50 is part of the overall programming for the microprocessor 26 which forms no part of the present invention. The subroutine 50 can be inserted at any suitable location in the program and includes an input 51 to test at block 52 whether the last exit flag is set. If it is not set, the subroutine is not called up and the main program proceeds from port 53 of block 52. In the event the last exit flag is set, which can either be automatic, if desired, or can be operator enabled by the actuation of a control switch 21 in interface circuit 28, the microprocessor first retrieves the current vehicle position as indicated by block 54. It does this by interrogating the GPS module 38 which provides the current latitude/longitude information to the microprocessor, which then stores the current vehicle position.

Next, as indicated by block 56, the microprocessor obtains location information for the next two exits of the limited access highway on which the operator is traveling for the desired services, as, for example, fuel availability. Such information will include not only the location of the service facility but also the availability of such facility (i.e., whether it is open at the time of the requested information). This information can be accessed in a variety of manners by, for example, a database 27 (FIG. 2) contained on the vehicle in mass storage memory such as a CD-ROM, which includes the highway information on which the vehicle is traveling in memory, as well the available services. The database 27 will thus include the data storage medium, a reader such as a CD-ROM drive and a controller coupled to the microprocessor for transferring data to the microprocessor. The programming for the transfer of location data for, for example, service locations $S_1$ and $S_2$ based on the vehicle's current position, can be conventional. Such a system is described in U.S. Pat. Nos. 5,172,321 and 5,229,947, the disclosures of which are incorporated herein by reference. Preferably, however, the microprocessor 26 obtains such service location information from an inquiry to a subscription service through the two-way paging module 34. It accomplishes this by initiating an information request utilizing the paging module 34 and receiving such data from a centrally located base station having a database of such information via a paging network service such as is commercially available from SkyTel Corp., located in Jackson, Miss. The paging module 34 can transmit the current vehicle location to the subscription service upon operator request or automatically on a repeating time cycle. Pager 34 receives the location information as, for example, $S_1$ and $S_2$ of FIG. 1(a), and provides such information in a digital signal format to the microprocessor 26, which is conventionally programmed to calculate the distance from the current vehicle location to the $S_1$ and $S_2$ available service facilities at the forthcoming two exits.

This information is stored by the microprocessor and compared with the distance-to-empty data which is retrieved as indicated by block 58 from the vehicle bus interface circuit 22. The program then compares the distance from the vehicle's current location to each of the service areas $S_1$ and $S_2$ of FIG. 1(a) to determine if the remaining fuel is sufficient to reach the second service area $S_2$ represented by distance X in the test block 60 of FIG. 4. If this distance is greater than the range available to the vehicle, a notification signal is sent to the driver as indicated by block 62. This notification signal can take the form of an audible alarm tone, a visual message in alpha-numeric format on a vehicle digital display contained within circuit 28, or both. In the example of FIG. 1(a), the notification signal alerts the driver that he or she should exit the limited access highway at exit A such that the first service area $S_1$ can be accessed prior to running out of fuel. Depending on the location information obtained as indicated by block 56, it is possible that service area $S_2$,which is on the second exit, is actually closer than service area $S_1$,and assuming it is less than the distance to empty, no notification signal would take place and the testing cycle is repeated as indicated by the connecting line 64 as the vehicle continues to travel along the highway. A notification or alerting alarm would then be sent, most likely between exits A and B and before the vehicle passed exit B.

In place of the automatic system described, the vehicle operator may input specific desired services in addition to or in place of a distance-to-empty last exit service. Thus, for example, the operator may wish to exit the limited access highway to have dinner within a prescribed period of time or at a preferred restaurant. In such case, the system allows the 10 operator to request the locations of such services as shown in phantom in block 55 of flow diagram 50. The vehicle operator is requested to input information as to a desired available service through the two-way pager module 34. This can be done by the operator sequentially receiving one-line page messages scrolled on display 19 and actuating a switch 21 when the desired service facility is identified to transmit such selection to the subscription database through pager 34. The database would then send the service facility location back to the vehicle. The microprocessor stores this information and compares it with vehicle location information from receiver 38 to alert the driver to exit when appropriate for the selected service facility. Such information is input to the microprocessor from its receipt from the pager module 34 or, alternatively, the on-board database 27 for such service location information as indicated by block 56. The distance for the selected service can be calculated by the same calculations provided in block 60 to alert the driver as indicated by block 62 to exit the highway at the next exit.

With such a system, therefore, the microprocessor notifies the vehicle operator with a suitable warning that the service necessary or desired should be sought at the forthcoming exit in the case of a limited access highway, or the next crossroad, for example, on a non-limited access highway. As can be appreciated, the system has greater need in situations where a limited access highway is being traveled and exits are spaced at long distances. The system of the present invention automatically assists the vehicle operator in preventing the vehicle from running out of fuel and/or assists the vehicle operator in seeking desired services within a prescribed time or other parameter. The unique use of the GPS receiver in combination with an automatically operated or operator prompted two-way pager allows location information to be communicated to and from the vehicle from a subscription service database to achieve such an alerting system.

It will become apparent to those skilled in the art that various modifications to the preferred embodiments of the invention disclosed herein can be made without departing from the spirit or scope of the invention as defined by the appended claims.

The embodiments of the invention in which an exclusive property or privilege is claimed are defined as follows:

1. A vehicle exit alert system comprising:

a source of signals indicating the current vehicle location;

a two-way pager for transmitting and receiving signals from and to the vehicle respectively for requesting location of service facilities and transmitting the current vehicle location data to a fixed central database and receiving service facility location data therefrom, said received service facility location data identifying available service facilities that are accessible via at least two roadway exits;

a processor coupled to said source and pager for comparing data from said source and said pager, said processor determining distance from the vehicle location to each of the available service locations and further determining whether the vehicle should exit the next upcoming exit in order to reach one of said available service facilities; and an alarm coupled to said processor for providing vehicle operator alerting signals based upon a predetermined relationship of vehicle location data and service location data, wherein said alarm alerts the vehicle operator to exit the next exit in order to reach said one of said available service facilities.

2. The system as defined in claim 1 wherein said source comprises a receiver for receiving vehicle location determining signals.

3. The system as defined in claim 2 wherein said receiver is a G.P.S. receiver.

4. The system as defined in claim 1 wherein said processor provides an alarm control signal when said vehicle location is proximate the next available service facility location.

5. The system as defined in claim 1 and further including a circuit coupled to said processor for providing data for determining distance-to-empty information for a vehicle and wherein said processor compares the distance of such distance-to-empty information with the distance to the next available service facility to generate a last exit warning signal for the vehicle operator.

6. A vehicle operator alerting system comprising:

a receiver for receiving signals for determining the vehicle location;

a transceiver for transmitting and receiving signals from and to the vehicle respectively for requesting location of available service facilities and transmitting the vehicle location to a fixed central database and receiving available service facility locations which are accessible via at least two roadway exits;

a processor coupled to said receiver and transceiver for controlling data between said receiver and transceiver, said processor further determining distance from the vehicle location to each of the available service locations and determining whether the vehicle should exit the next upcoming roadway exit in order to reach one of said available service facilities; and a circuit for alerting the vehicle operator when a predetermined relationship of data supplied to said processor by said receiver and said transceiver exists, including alerting the vehicle operator to exit the next roadway exit in order to reach said one of said available service facilities.

7. A vehicle communication system comprising:

a rearview mirror housing mounting to a vehicle;

a two-way pager for transmitting and receiving signals from and to the vehicle respectively, said two-way pager mounted to said rearview mirror housing;

a circuit coupled to said two-way pager for supplying operating power to said pager from the vehicle's electrical system; and a display coupled to said rearview mirror housing for displaying paging messages, wherein said vehicle communication system provides vehicle exit alert to the vehicle operator to exit the next roadway exit in order to reach an available service facility.

8. The system as defined in claim 7 and further including a G.P.S. receiver mounted in said housing.

9. A vehicle exit alert system comprising:

a first source of signals indicating the current vehicle location;

a second source of signals indicating the location of available service facilities for at least two upcoming exits along a roadway;

a processor coupled to said first and second sources for comparing data from said first and second sources and determining distance from the current vehicle location to each of the available service facilities, said processor further determining whether the vehicle should exit the next upcoming exit in order to reach one of said available service facilities; and an alarm coupled to said processor for providing vehicle operator alerting signals based upon a predetermined relationship of vehicle location data and service location data obtained from said first and second sources, including providing alerting signals to alert the vehicle operator to exit the roadway at the next upcoming exit so as to reach said one of said available service facilities.

10. The system as defined in claim 9 wherein said second source comprises a two-way pager.

11. The system as defined in claim 9 wherein said first source is a G.P.S. receiver.

12. The system as defined in claim 9 wherein said second source is a mass storage media coupled to said processor.

13. The system as defined in claim 9 and further including a circuit coupled to said processor for providing data for determining distance-to-empty information for a vehicle and wherein said processor compares the distance of such distance-to-empty information with the distance to the next available service facility to generate a last exit warning signal for the vehicle operator.

14. A fuel warning vehicle exit alert system for mounting in a rearview mirror housing of a vehicle, said system comprising:

a G.P.S. receiver for providing signals indicating the current vehicle location;

a two-way pager mounted to the rearview mirror housing for transmitting and receiving signals from and to the vehicle respectively for requesting location of fuel service facilities and transmitting the current vehicle location data to a fixed central database and receiving fuel service facility location data therefrom;

a circuit for providing data for determining distance-to-empty information for a vehicle;

a processor coupled to said receiver, to said pager and to said circuit for comparing data from said receiver, said pager and said circuit wherein said processor compares the distance of such distance-to-empty information with the distance to the next available fuel service facility to generate a last exit warning signal for the vehicle operator; and an alarm coupled to said processor and responsive to said last exit warning signal for providing vehicle operator alerting alarm.

15. A vehicle operator alerting system for automatically alerting a vehicle operator to exit a limited access roadway in order to access a service facility, said alerting system comprising:

a G.P.S. receiver for determining the current vehicle location;

a source of signals identifying service facility locations for a plurality of available service facilities which are accessible via at least two roadway exits of the limited access roadway;

a processor coupled to said receiver and said source for comparing data from said receiver and source, said processor determining distance from the vehicle location to each of the available service locations corresponding to said at least two roadway exits and determining whether the vehicle should exit the next upcoming roadway exit in order to reach one of said available service facilities; and a circuit coupled to said processor for alerting the vehicle operator when a predetermined relationship exists of data supplied to said processor by said receiver and said source, including alerting the vehicle operator to exit the next roadway exit in order to reach said one of said available service facilities.

16. The system as defined in claim 15 wherein said source comprises a receiver for receiving service facility location determining signals.

17. The system as defined in claim 16 wherein said receiver is a two-way pager.

18. The system as defined in claim 17 wherein said system is mounted in a rearview mirror housing.

19. The system as defined in claim 15 wherein said source is a mass storage media coupled to said processor.

20. The system as defined in claim 15 further including a circuit coupled to said processor for providing data for determining distance-to-empty information for a vehicle, wherein said processor compares distance of said distance-to-empty information with the distance to the next available service facilities accessible from the next two roadway exits to generate a last exit warning signal for the vehicle operator.

21. The system as defined in claim 15 wherein said source of signals further identifies operating times for said identified service facilities, and said processor determining which exit the vehicle should exit further as a function of said operating times.

* * * * *